United States Patent Office 3,358,529
Patented Dec. 19, 1967

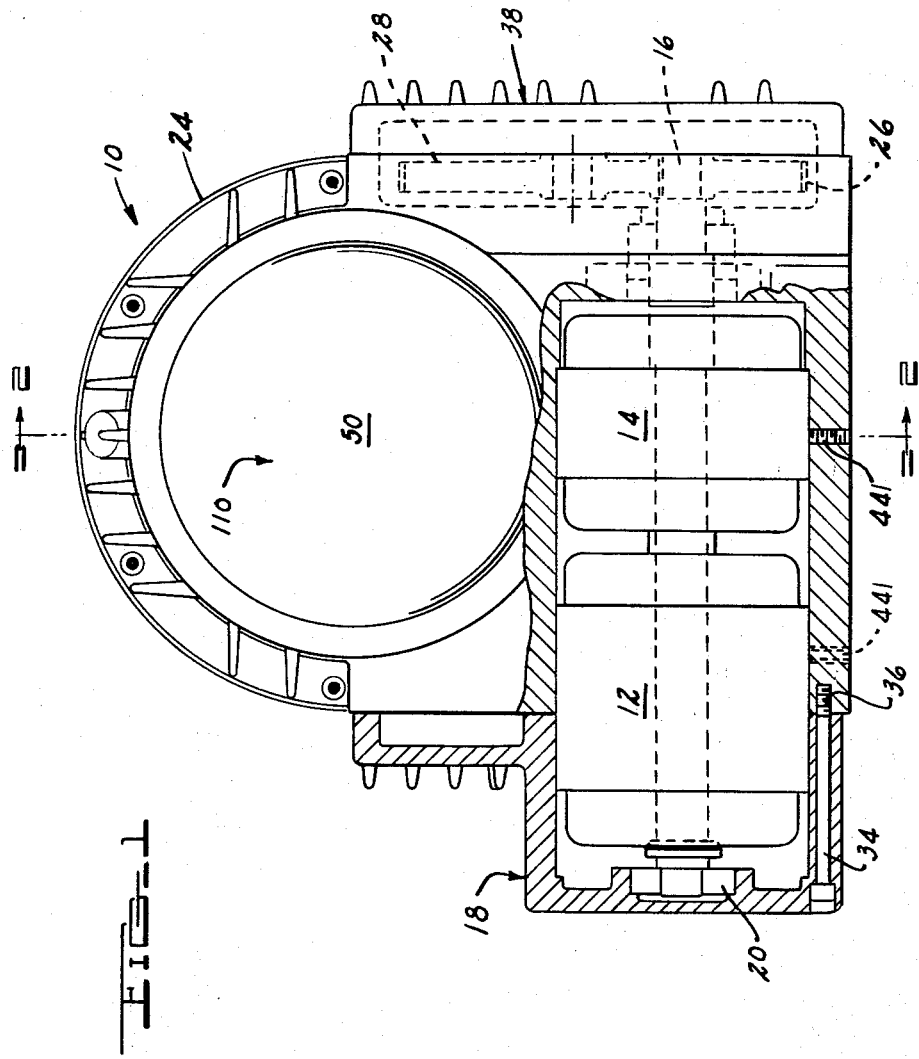

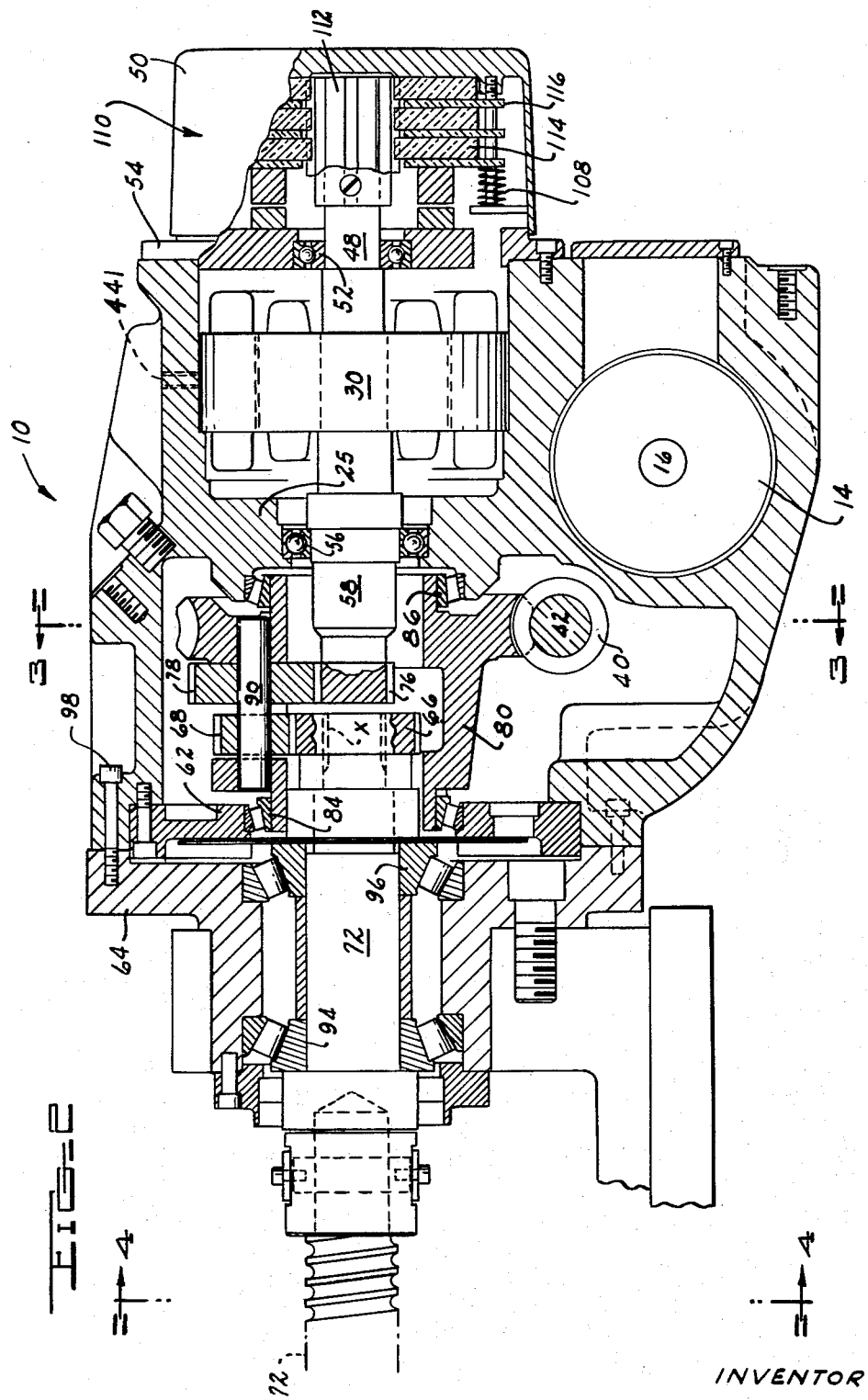

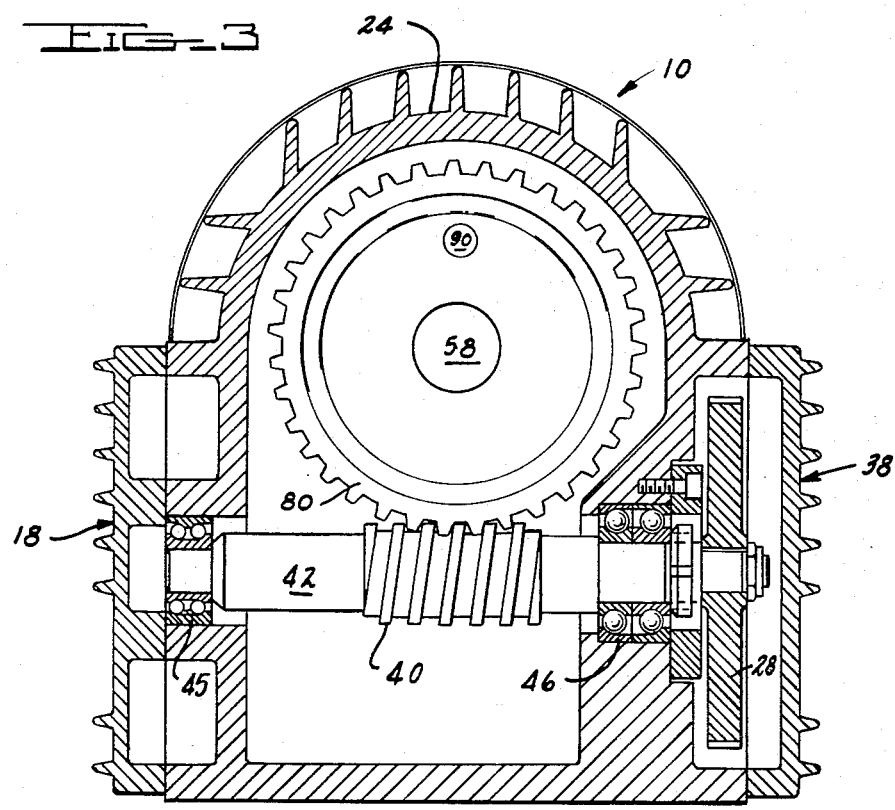

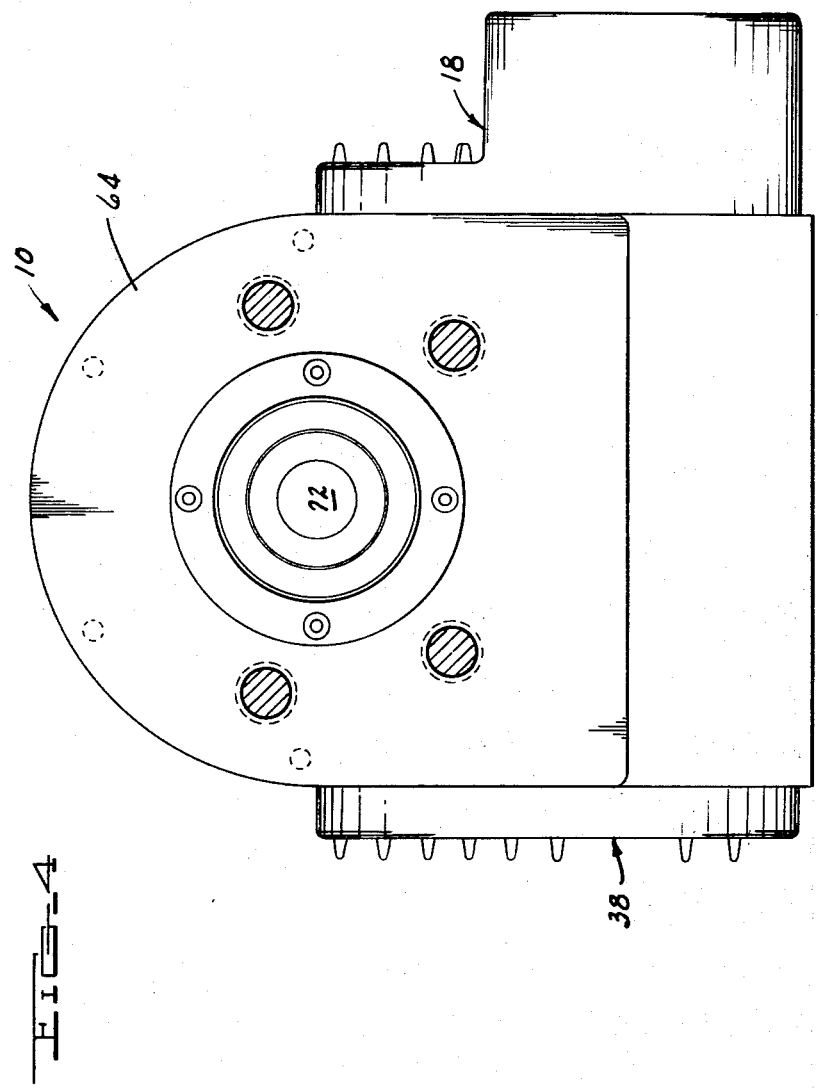

3,358,529
MACHINE TOOL
John van den Kieboom, Mount Clemens, Mich., assignor to La Salle Machine Tool, Inc., Warren, Mich.
Filed May 21, 1965, Ser. No. 457,599
1 Claim. (Cl. 74—675)

ABSTRACT OF THE DISCLOSURE

A mechanically driven machine tool which can be driven at several speeds by virtue of the inclusion therein of a pair of in-line electric motors which are selectively operable to drive a first shaft extended therethrough at different speeds, and a third electric motor which is operable to drive a second shaft at still a different speed. A worm gear is driven by the first shaft, a worm wheel is driven by the worm gear, a gear reduction unit is mounted on the worm wheel and driven by the second shaft, an output shaft is drivingly connected to the gear reduction unit, and selectively operable brakes are provided for the first and second shafts.

---

The present invention relates to new and useful improvements in machine tools and more particularly to an efficient, self-contained, mechanically driven multi-speed machine tool which is interchangeable with hydraulically actuated tools now used in the industry.

It is a primary object of the present invention to provide a mechanically driven machine tool which can be driven at several speeds.

Another object of the invention is the provision of a self contained machine tool with change gears which are readily accessible without major dismantlement of the machine.

Another object of the invention is the provision of a unitary, self-contained machine tool which can be substituted for hydraulic equipment now in use.

Still another object of the invention is the provision of a self-contained machine tool which does not require constant inspection for leaks in the valves, tanks and piping.

Another object of the invention is the provision of a multi-speed machine tool wherein the output speed and torque is variable within a pre-selected range.

These and other objects of the present invention can be accomplished by the provision of a unitary, self-contained machine tool which has, a housing body; a worm gear, said worm gear keyed to a shaft in said housing body; a worm wheel; a first output shaft; a second output shaft; a plurality of reduction gears disposed between said first and second output shaft members; a first multi-speed driving means for rotating said worm gear and shaft; a second driving means for rotating said reduction gears, the shaft for said second driving means and said second output shaft being one and the same; said first multi-speed driving means and said second driving means disposed at right angles to each other and enclosed in said body housing; a magnetic friction brake secured to said body housing and cooperable with said second output shaft; means for adjusting said magnetic friction brake to provide a pre-determined torque load; interchangeable change gears intermediate said first multi-speed driving means and said worm gear shaft, said change gears on the outside of said body housing for quick and easy accessibility without major dismantlement of the machine; selective and simultaneous rotation of said multi-speed driving means and said second driving means results in said first output shaft rotating rapidly, while energization of said brake and de-energization of said second driving means results in said first output shaft rotating at a slower rate, should an obstruction of the output torque occur, the torque load will be transferred to the second output shaft and the friction brake will be caused to slip.

Other objects of the invention will appear in the following description and appended claims, reference being had to the accompanying drawings which form a part of this specification, wherein like reference characters designate corresponding parts in the several views.

In the drawings:

FIGURE 1 is an end elevation of a machine tool which embodies the present invention, with the housing body broken away to expose the multi-speed driving means.

FIGURE 2 is a cross sectional view taken along lines 2—2 of FIGURE 1.

FIGURE 3 is a cross sectional view taken along lines 3—3 of FIGURE 2 illustrating the worm and worm wheel drive.

FIGURE 4 is a front elevational view taken in the direction of the arrows 4—4 of FIGURE 2.

Before explaining the present invention in detail, it is to be understood that this invention is not limited in its application to the details of construction and arrangement of parts illustrated in the drawings, since the invention is capable of other embodiments and of being practiced and carried out in various ways. Also, it is to be understood that the phraseology or terminology employed herein is for the purpose of description and not limitation.

Looking now at the drawings, FIGURE 1 shows an end elevation of a machine tool which embodies the present invention, with parts broken away to illustrate the multi-speed driving means. It will be noted from this view that the machine tool illustrated is of generally symetrical configuration. The multi-speed driving means consists of two electric motors 12 and 14 which drive the same output shaft 16. Shaft 16 can be of unitary structure or it may be two shaft members coupled together. The left end of shaft 16 is journaled in a bearing 20 mounted in the cover member 18, while the right end of shaft 16 is journaled in bearing 22 located in the housing 24. In addition, the right end of shaft 16 has keyed thereto a change gear 26 which is cooperable with a second change gear 28. Change gear 28 is located on a worm gear shaft 42 which is generally parallel to shaft 16. This can best be seen in FIGURE 3. Each of the respective change gears 26 and 28 are readily accessible and can be quickly changed by removal of the cover member 38. Both of the covers are secured to the housing 24 with screws 34 which engage threaded openings 36 in the housing 24 proper.

FIGURE 2 of the drawings shows a cross section taken substantially along lines 2—2 of FIGURE 1. In this view, a third electric motor 30 is illustrated. Motor 30 is piloted in the housing 24 as are motors 12 and 14. Turning of the motor housings within the pilot is prevented by the use of set screws 44 located in the housing 24. The worm gear shaft 42 is journaled in bearings 44 and 46. Bearing 45 (FIG. 3) supports the left end of the shaft, while bearing 46 supports a portion of the worm gear shaft 42 to the right of the worm gear 40. Each of the respective bearings is mounted in alignment and located in the housing 24. As has been previously stated, change gear 28 is secured to the end of the worm gear shaft 42, adjacent bearing 46. Change gears 26 and 28 are positioned in toothed engagement and are keyed to their respective shaft members 16 and 42. Thus, when one of the multi-speed motors 12 or 14 is energized and caused to rotate, change gear 26 will rotate change gear 28, which in turn will rotate worm gear shaft 42.

The second drive motor, which is in fact the third motor 30, is positioned in the housing 24 at substantially right angles to the first multi-speed drive motors 12 and 14. Motor 30 is generally positioned along the longitudinal axis of the housing 24, with the shaft extension 48 on the right end thereof located in a bearing 52 supported by flange 54. Flange 54 also serves to locate and support a magnetic friction brake 50 which is secured thereto, with the flange proper being secured to the housing 24. The shaft extension on the left end of the motor 30 is identified by number 58 and is supported by bearing 56 in the vertical housing wall 25. The front portion of the housing 24 is of two part construction, with one cover member 62 inside of cover 64 and both covers are secured to the housing 24. Cover section 62 has a bearing 84 in the central portion thereof to support the left end of the worm gear housing 80, while a second bearing 86 in the housing wall 25 supports the right end of said worm gear housing 80. The worm gear housing 80 is generally hollow and has a plurality of reduction gears mounted therein. Reduction gears 68 and 78 are rotatably mounted on shaft 90, which is supported in said worm gear housing 80, while reduction gears 66 and 76 are mounted in toothed engagement with gears 68 and 78 respectively. Reduction gear 76 is located on the end of motor shaft 58, while gear 66 is positioned on the splined portion of the output shaft 72. The splined portion is identified by numeral 74. The output shaft 72 is carried by the front cover member 64 and is supported by bearings 94 and 96. Bearings 94 and 96 are located within said cover 64. Cover 64 is secured to the front of the housing with screws 98 which extend through the housing 24.

A sleeve member 112 is keyed to the right end of the motor shaft 48. The sleeve member 112 has a plurality of teeth thereon which drive a plurality of friction discs 114. Interposed between each of the driven friction discs 114 are a plurality of fixed discs 116. The fixed discs 116 are pre-loaded in any desired amount so as to provide a limited slip. To increase the friction load, the electromagnet is energized. This can be accomplished either manually or automatically. The complete brake assembly is identified by numeral 110. The preload of the friction brake is accomplished by the use of mechanical springs 108.

In operation, selective rotation of motor 12 or 14 will rotate shaft 16, which in turn rotates change gears 26 and 28 to rotate the worm gear shaft 42. This of course rotates the worm 40 on the shaft 42. Energization of motor 30 drives shaft 58 which rotates reduction gears 76, 78, 68 and 66. This in turn rotates the output shaft 72 rapidly. With de-energization of the motor 30 and energization of the magnetic brake 110, the output shaft 72 will rotate at a slower speed, while motor 12 or 14 will drive the worm gear 40 and worm wheel 80. Should the output shaft become obstructed, the drive will slip the friction brake 110. This will prevent any overload in excess of the pre-determined friction load. Since shaft 16 rotates with the operation of either of the motors 12 or 14, it will be readily apparent that the present invention provides a machine tool which will operate at several output speeds.

From the foregoing description, it will be recognized that the present invention is simple, durable and utilitarian. It can be manufactured in quantity with modern mass production methods and the use of such a machine will not be dependent on the use of hydraulic equipment, such as pumps, tanks, accumulators and the like, although the machine is interchangeable with such equipment.

Having thus described my invention, I claim:

In a self-contained, mechanically driven machine tool, the combination of, a machine tool housing; a worm gear and worm wheel journaled in said machine tool housing; a plurality of reduction gears journaled on said worm wheel; a pair of parallel shafts in said housing; a pair of in-line electric motors of different sizes positioned about and selectively energizable to rotate one of said pair of shafts to provide a two speed driving means for said one shaft; the other one of said shafts being drivingly connected to said worm gear; change gears external of said housing and extending between said pair of shafts; a single speed driving means drivingly connected to said reduction gears; a friction brake cooperable with said single speed driving means and operable to discontinue the driving connection thereof to said reduction gears; and an output shaft drivingly connected to one of said reduction gears; so that selective energization of said motors will, along with rotation of said single speed driving means, rotate the output shaft at a high rate of speed, while de-energization of said single speed driving means and energization of the friction brake will cause said output shaft to rotate at a slower rate of speed determined by which one of said pair of motors is energized.

References Cited

UNITED STATES PATENTS

| | | | |
|---|---|---|---|
| 1,270,964 | 7/1918 | McCloud | 74—675 |
| 1,493,869 | 5/1924 | Ruggles | 74—675 |
| 1,594,395 | 8/1926 | Weston | 74—675 |
| 2,422,343 | 6/1947 | Duer | 74—675 |
| 2,519,042 | 8/1950 | Granberg et al. | 74—675 |
| 2,652,919 | 9/1953 | Jochem | 318—45 |
| 2,704,343 | 3/1955 | Streuber et al. | 318—45 |
| 2,780,893 | 2/1957 | Seborg et al. | 74—675 |
| 2,800,619 | 7/1957 | Brunt | 318—45 |
| 3,146,636 | 9/1964 | Wollenhaupt et al. | 74—675 |
| 3,182,526 | 5/1965 | Zajac | 74—675 |

DONLEY J. STOCKING, Primary Examiner.

DAVID J. WILLIAMOWSKY, ARTHUR T. McKEON, Examiners.

J. R. BENEFIEL, Assistant Examiner.